Nov. 18, 1924.
L. C. HIATT ET AL
1,515,738
STORAGE BATTERY SEPARATOR
Filed Sept. 24 1923
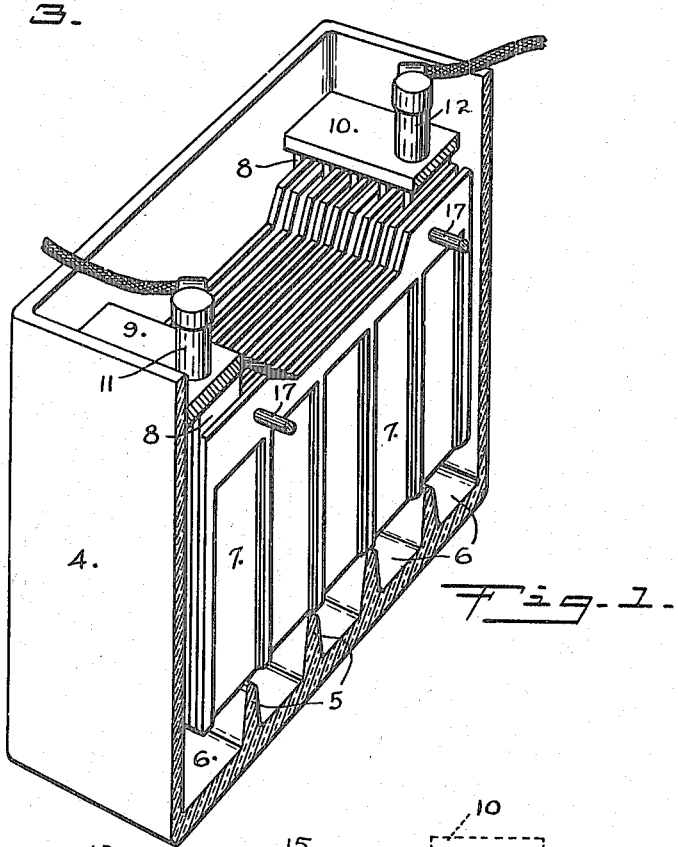
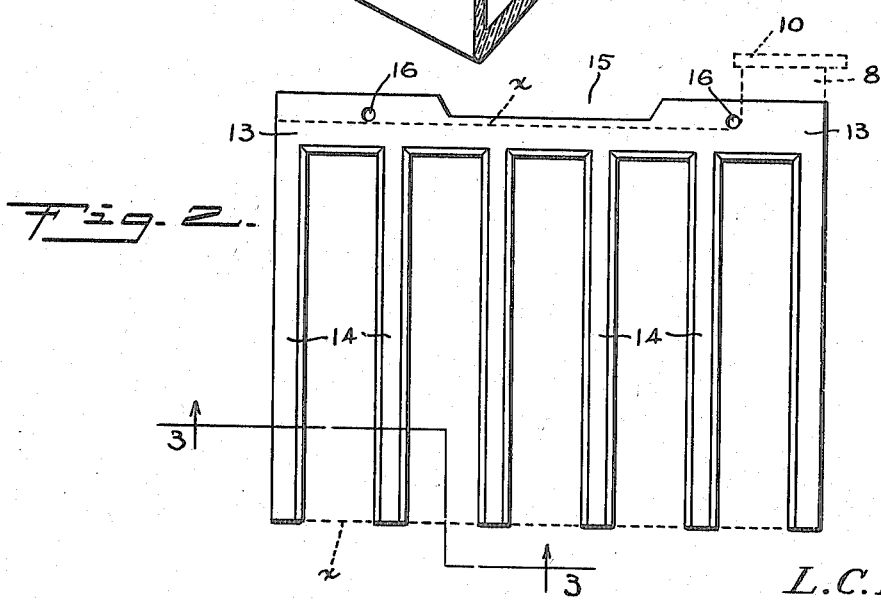
Inventors:
L. C. HIATT,
D. L. PORTER.
By David O. Barnell.
Attorney.
Witness:
R. J. Honomichl.

Patented Nov. 18, 1924.

1,515,738

UNITED STATES PATENT OFFICE.

LAWRENCE C. HIATT AND DALLAS L. PORTER, OF ATLANTIC, IOWA.

STORAGE-BATTERY SEPARATOR.

Application filed September 24, 1921. Serial No. 502,913.

*To all whom it may concern:*

Be it known that we, LAWRENCE C. HIATT and DALLAS L. PORTER, citizens of the United States, and residents of Atlantic, in the county of Cass and State of Iowa, have invented certain new and useful Improvements in Storage-Battery Separators, of which the following is a specification.

Our invention relates to secondary batteries, and particularly to portable storage batteries of the type commonly used for starting-and-lighting systems of motor vehicles, and where the battery is subjected, when in use, to considerable mechanical vibration, swaying and jarring, aside from the normal deteriorative effects due to repeated charging and discharging thereof. It is the object of our invention to provide a simple, inexpensive and durable separator for the plates used in such batteries, the separator being adapted to afford between the battery plates a maximum unobstructed area of cross-section for the electrolyte, while positively preventing contact between the plates by warping or buckling thereof or by bodily lateral displacement. A further object of our invention is to provide a plate separator adapted to avoid the lodgement between battery plates of material loosened from the bodies of the plates, and to permit the deposit of such loosened material in the space provided therefor at the bottom of the jar, whereby to prevent such material forming a bridge or short-circuiting connection between adjacent plates. A further object of our invention is to provide a separator for battery plates having simple means for supporting and retaining the same in proper relation to the plates, and affording space for the withdrawal of samples of the electrolyte for testing purposes.

In the accompanying drawings Fig. 1 is a perspective view of a battery equipped with separators embodying our invention, the jar being in section or broken away to disclose the interior structure and arrangement, Fig. 2 is a side view of one of the separators, and Fig. 3 is a detail horizontal section on the line 3—3 of Fig. 2.

Referring to Fig. 1, there is represented an ordinary battery jar 4 having in the lower portion thereof a series of transverse ribs 5 between which are spaces 6 forming the so-called "mud-cellar" for receiving the sediment resulting from disintegration of the plates. Each of the battery plates 7 has at one end an upwardly projecting lug 8, the lugs on the positive plates being at one end of the jar, and those on the negative plates being at the opposite end, the several lugs at the respective ends being connected to the bars 9 and 10 which carry the terminal-posts 11 and 12. The lower edges of the plates rest upon the upper edges of the transverse ribs 5, and the terminal posts extend through the jar-cover (not shown). It will be understood that all of the foregoing structure is common and well-known, and is shown merely to clearly illustrate the assemblage and structural invironment of our separators when in use.

Each of the separators is an integral body, preferably of vulcanite or similar electrical insulating material of considerable strength and rigidity, and each separator comprises an upper horizontal bar-portion 13 with a series of vertical bars or fingers 14 extending downwardly therefrom. The adjacent edges of the fingers 14, and the lower edges of the bar 13, between the fingers, are beveled at both sides as shown clearly in Fig. 3. The upper edge of the bar 13 has a notch or recess 15 at the central portion thereof, and at points intermediate said recess and the ends of the bar there are circular openings 16, as shown. Said openings 16 are for receiving the supporting-rods 17, which are formed of suitable insulating material such as vulcanite, two of the rods being passed through the alined openings of the entire series of separators, as shown in Fig. 1. The parts are so proportioned that when the lower ends of the fingers 14 are even with the lower edges of the battery-plates, the rods 17 will rest on the upper edges of the plates, each of the rods also resting against the inner edges of one of the series of lugs 8, whereby to prevent longitudinal shifting of the separators relative to the plates. The relation of each separator to the adjacent plates will be clearly apparent from Fig. 2, wherein the outline of one of the plates is shown by the dotted lines *x*. It will be understood, of course, that one of the separators is disposed between each adjacent pair of the battery-plates. The upper edges of the separators, at the bottoms of the recesses 15, are slightly above the upper edges of the plates so that the appearance of said portions of the separators above the electrolyte serves to indicate to the user the necessity for adding to the electrolyte to bring the same to a proper height in the jar.

The recesses 15, being alined in the assembled structure, form a trough-like space into which a pipette may be introduced for withdrawing samples of the electrolyte for testing purposes.

It will be seen that by the use, in batteries of the class described, of separators made in accordance with our invention, there is left between the battery plates a large cross-sectional area of the electrolyte which is entirely unobstructed, so that the internal resistance of the battery is reduced to a minimum. It will also be seen that the extension of the fingers 14 between the plates will effectually prevent warping, buckling or mechanical displacement of the plates such as to bring them into contact with each other. It will also be seen that any material which is displaced, from the sides of the plates, in the spaces between the fingers 14 of the separators, may fall freely into the spaces 6 at the bottom of the jar, and such displaced material is thus prevented from lodging between the plates, whereby to constitute or to cause the formation of a short-circuiting connection between them. It will be seen further, that by the bevelling of the edges of the fingers 14, the distance over the surface of the separator from a point of contact with one plate to a point of contact with another plate is considerably greater than the thickness of the separator, thus reducing tht possibility of short-circuiting by the formation or deposit of conductive material upon the surface of the separator which is open to the electrolyte.

Now, having described our invention, what we claim and desire to secure by Letters Patent is:

A plate separator for storage batteries, comprising an integral sheet of electrolyte-resistant insulating material rectangularly recessed from its lower edge to form a plurality of vertical transversely spaced fingers depending from the upper horizontal portion of the sheet, said upper horizontal portion being recessed centrally of its upper edge and perforate laterally of said central recess to receive supporting-rods, and the vertical edges of said depending fingers being beveled at each side of the sheet, whereby the shortest surface-elements between the plate-engaging surfaces of the sheet are of greater length than the thickness of the sheet.

LAWRENCE C. HIATT.
DALLAS L. PORTER.